(12) United States Patent
Edwards

(10) Patent No.: US 9,629,344 B2
(45) Date of Patent: Apr. 25, 2017

(54) PROCESS FOR UTILIZING DUAL USE PACKAGING

(71) Applicant: Shaun Edwards, Del Mar, CA (US)

(72) Inventor: Shaun Edwards, Del Mar, CA (US)

( * ) Notice: Subject to any disclaimer, the term of this patent is extended or adjusted under 35 U.S.C. 154(b) by 285 days.

(21) Appl. No.: 14/185,474

(22) Filed: Feb. 20, 2014

(65) Prior Publication Data

US 2015/0230435 A1 Aug. 20, 2015

(51) Int. Cl.
| | | |
|---|---|---|
| *A01K 63/00* | (2017.01) | |
| *A01K 63/04* | (2006.01) | |
| *A01K 63/06* | (2006.01) | |
| *A01K 61/85* | (2017.01) | |

(52) U.S. Cl.
CPC ............ *A01K 63/006* (2013.01); *A01K 61/85* (2017.01); *A01K 63/04* (2013.01); *A01K 63/042* (2013.01); *A01K 63/06* (2013.01)

(58) Field of Classification Search
CPC .... A01K 63/025; A01K 63/042; A01K 63/04; A01K 63/006; A01K 61/85
USPC .......................... 119/253–258, 263, 267–269
See application file for complete search history.

(56) References Cited

U.S. PATENT DOCUMENTS

| | | | | |
|---|---|---|---|---|
| 3,265,388 | A * | 8/1966 | Kane, Jr. .......................... | 472/67 |
| 3,304,912 | A | 2/1967 | Hackman et al. | |
| 3,324,573 | A * | 6/1967 | Lavallee ........................ | 434/300 |
| 3,326,185 | A | 6/1967 | Perez | |
| D214,431 | S | 6/1969 | Willinger | |
| 3,499,526 | A | 3/1970 | Willinger | |
| 3,874,340 | A * | 4/1975 | Lemond et al. ............ | 119/51.04 |
| 4,073,397 | A | 2/1978 | Snodgrass | |
| D279,317 | S | 6/1985 | Goldman et al. | |
| 4,787,336 | A * | 11/1988 | Lineberry ...................... | 119/246 |
| 4,788,938 | A * | 12/1988 | Davenport ........... | A01K 63/006 |
| | | | | 119/246 |
| 5,143,020 | A * | 9/1992 | Patrick .......................... | 422/265 |
| 5,676,251 | A | 10/1997 | Credle, Jr. | |
| 5,799,611 | A * | 9/1998 | Park .............................. | 119/248 |
| 5,850,940 | A | 12/1998 | Sloan et al. | |
| 6,070,554 | A * | 6/2000 | Wilson ....................... | 119/51.04 |
| 6,109,210 | A | 8/2000 | Nasser | |
| 6,557,496 | B2 | 5/2003 | Herrenbruck | |
| 6,591,783 | B1 | 7/2003 | Lajeunesse | |
| D506,578 | S | 6/2005 | Cole | |
| 6,948,841 | B2 | 9/2005 | Tsai | |
| 7,213,537 | B2 | 5/2007 | Sabbaugh | |
| 7,793,618 | B2 | 9/2010 | Edwards et al. | |
| D632,023 | S | 2/2011 | Goldstein | |
| 7,918,187 | B2 | 4/2011 | Bagnall | |

(Continued)

FOREIGN PATENT DOCUMENTS

GB 2196821 A 5/1988

*Primary Examiner* — Joshua Huson
(74) *Attorney, Agent, or Firm* — Kelly & Kelley, LLP

(57) ABSTRACT

A process is disclosed for utilizing dual use packaging, particularly ornamental packaging containing a pet-related product as would be used with an aquarium. The ornamental container is filled with a pet-related product such as fish food. The fish food is selectively dispensed from the container until depleted. The container is then utilized as a decorative ornament in an aquarium. Ballast may be added to the ornamental container before being submerged in the aquarium. The ornamental container may resemble a lighthouse, a treasure chest, a rock sculpture, a wall block, a submarine, or a vase.

17 Claims, 10 Drawing Sheets

(56) References Cited

U.S. PATENT DOCUMENTS

| | | |
|---|---|---|
| 8,001,932 B2 * | 8/2011 | Kania et al. .................. 119/217 |
| 2004/0163605 A1 * | 8/2004 | Sabbaugh ..................... 119/254 |
| 2005/0022749 A1 * | 2/2005 | Amblard ....................... 119/269 |
| 2014/0261211 A1 | 9/2014 | Tuan et al. |

* cited by examiner

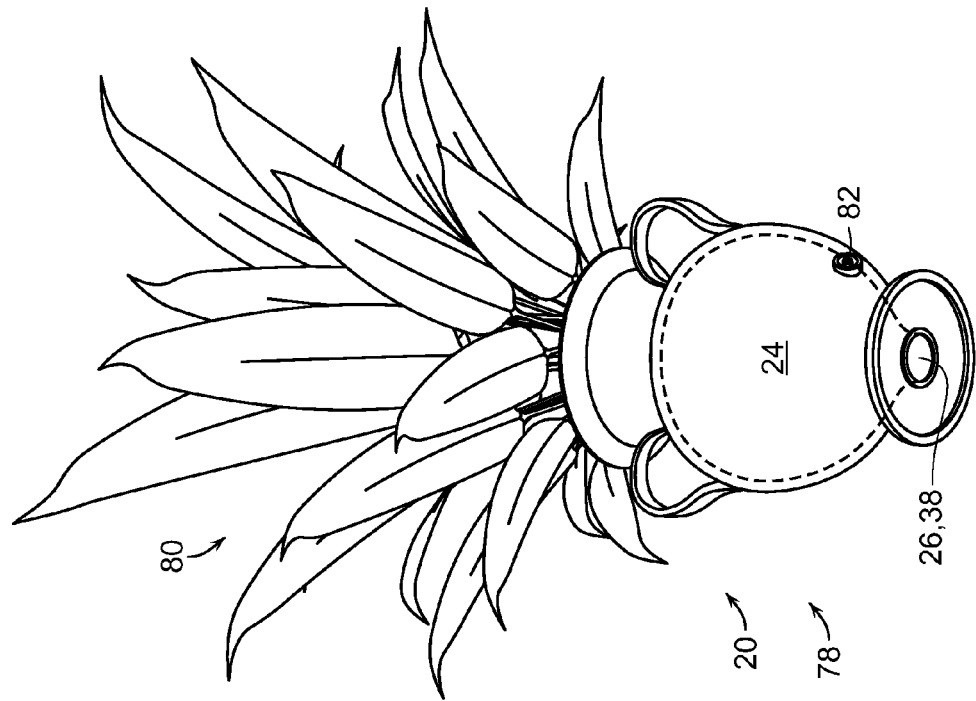
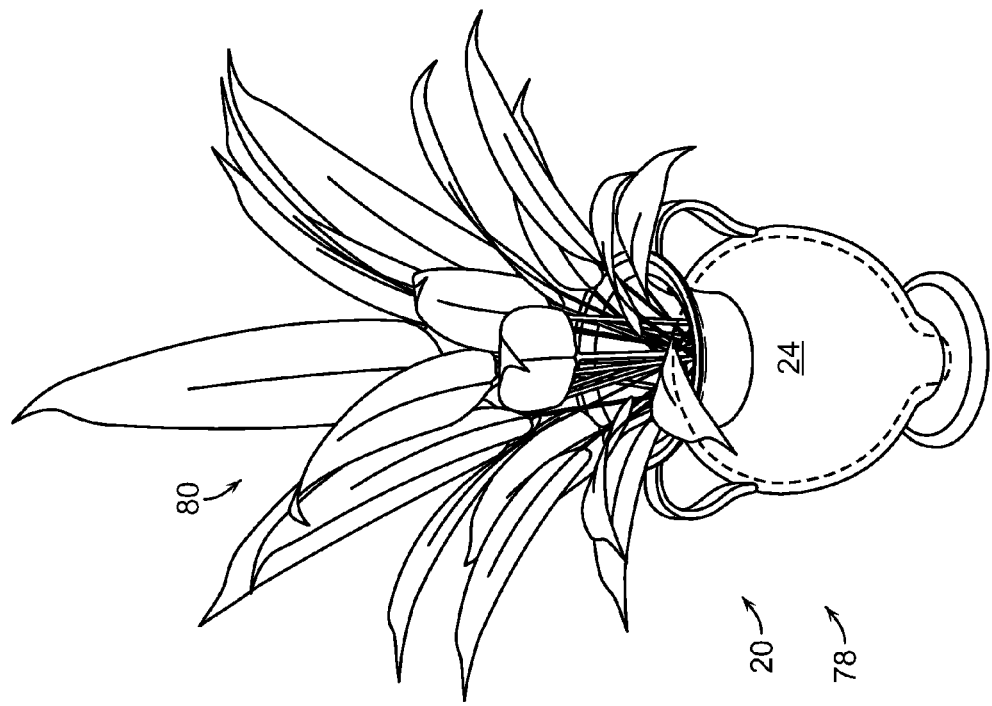

PROCESS FOR UTILIZING DUAL USE PACKAGING

FIELD OF THE INVENTION

The present invention generally relates to dual use packaging. More particularly, the present invention relates to the use of a container for dispensing a pet-related product and then utilizing the container as a decorative ornament in a pet environment. Specifically, the pet-related product is related to fish and the pet environment is an aquarium.

BACKGROUND OF THE INVENTION

Single use containers for retaining pet-related products, whether liquid or solid, are generally known in the art. Such containers may include hard outer shells or soft outer shells that are squeezable. Either way, the containers include an internal compartment with an opening to access that internal compartment. The internal compartment contains the pet-related product and allows a user to dispense the product from the container until the container is empty. Once the container is empty there is no use other than to possibly re-use the container to hold more pet-related product.

Ornamental decorations for pet environments, including aquariums, are also generally known in the art. Such decorative ornaments typically include nautical themes such as ships, chests, lighthouses, coral reefs, etc. Such decorations may also include additional elements such as lights, air bubbles, or moving parts.

As of the filing of this application, applicants have not found where anybody previously had combined containers for pet-related products and decorative ornaments into a single product. Accordingly, there is a need for a product and a process for utilizing such product for dual purposes. The present invention fulfills these needs and provides other related advantages.

SUMMARY OF THE INVENTION

The present invention is directed to a process for utilizing dual use packaging. The process begins with the step of filling a container with a pet-related or fish-related product. The container is filled through an opening that leads into an internal compartment. The pet-related or fish-related product is selectively dispensed from the internal compartment of the container through the opening. Once the pet-related or fish-related product is depleted, the container may be utilized as a decorative ornament in a pet environment such as an aquarium containing water. The pet-related or fish-related product preferably comprises fish food. A decorative element may be added to the container.

The process may further include the step of adding ballast to the internal compartment before utilizing the container as a decorative ornament. In addition, a plug means may be removed from a secondary opening to allow air trapped in the internal compartment to escape once the container is submerged under water. The ballast may comprise aquarium rocks or similarly dense material sufficient to hold the container submerged under water. Alternatively, the process may include attaching an anchor device, i.e., disc or pad, to a base of the container and securing the anchor device to a bottom of the aquarium as by suction cup, covering with rocks, or the like. The anchor device may comprise a threaded cap configured to attach to a threaded neck as on the opening to the internal compartment. The threaded cap may be removably attached to the threaded neck.

The container may resemble a lighthouse with a decorative element comprising a light source in a top of the lighthouse. The container may also resemble a treasure chest with the decorative element comprising a hinged lid capable of pivoting movement about the hinge. A bubbler may be attached to a fitting on the treasure chest such that air may be bubbled into a cavity on the hinged lid. As the air fills the cavity on the hinged lid, the hinged lid periodically lifts due to the buoyancy of the air in the water and releases the air such that the lid falls back down.

The container may also resemble a rock sculpture and the decorative element may comprise a passage through the rock sculpture. The container may resemble a wall block and the decorative element may comprise a stone or brick pattern. The wall block may further have a slot on a first side and a tongue on a second side. The process may further comprise the step of attaching the tongue of the wall block to a slot on a second wall block so as to form a longer wall.

The container may resemble a submarine with the decorative element comprising a plurality of LED lights along a length of the submarine and/or a propeller at a rear of the submarine. The process may further comprise the step of attaching a bubbler to a fitting on the submarine and bubbling air into the propeller so as to turn the propeller.

The container may further resemble a vase with the decorative element comprising a plant having leaves extending from a top of the vase. A bubbler may be attached to a fitting on the vase for bubbling air into the leaves of the plant so as to move the leaves.

In any of the foregoing embodiments, the surface of the container may be adorned with a lenticular or holographic material that produces three-dimensional or moving images on a two-dimensional surface. Such material may be adhered to the outer surface of the container to produce a desired visual presentation.

In an alternate embodiment, the process may further comprise the step of making the container buoyant in the water contained in the aquarium. An anchor base is then attached to the container by a length of fine cord, such as thread, cable, wire, fishing line, or the like, which is shorter than the depth of the water in the aquarium. The anchor base is attached or anchored to the bottom of the aquarium such that the buoyant container may float up until the cable is fully extended. The container will remain floating in mid-aquarium, so long as its buoyancy is maintained.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6A is an elevated perspective view of a container that resembles a vase;

FIG. 6B is a lower perspective view of a container that resembles a vase;

DETAILED DESCRIPTION OF THE PREFERRED EMBODIMENTS

Figure 1A:
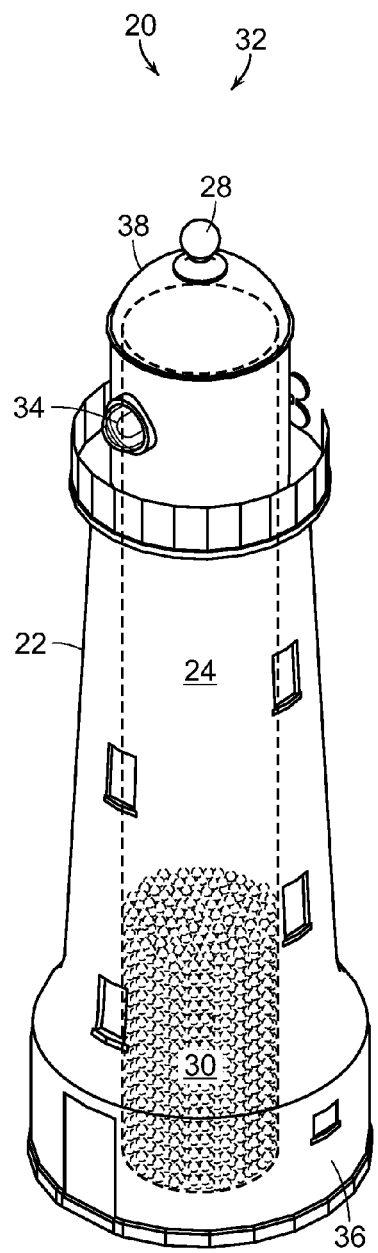
FIG. 1A is a perspective view of a container that resembles a lighthouse.

The present invention is directed to a process for utilizing dual use packaging or containers. More particularly, the present invention is directed to a process for using a container for a pet-related product such as fish food and then utilizing that container as an ornamental decoration in a pet environment such as an aquarium.

The container, generally referred to by reference numeral 20 herein, is depicted in FIGS. 1-7 in its various embodiments. The container 20 generally comprises an outer structure or housing 22, an internal compartment 24 and an opening 26 for accessing the internal compartment 24. The container 20 may also comprise a plug 28 or similar structure, i.e., diaphragm, membrane, etc., covering a secondary opening 26a which is smaller than the primary opening 26. The secondary opening 26a is configured primarily for the purpose of releasing air that may be trapped in the internal compartment 24 when the container 20 is submerged in an aquarium. The container 20 may be decorated or itself comprise ornamental features, as described below.

When the container 20 is initially prepared it contains a quantity of a pet-related product 30. Such pet-related product 30 preferably comprises food as the container 20 is primarily directed towards use with fish and other aquarium-related pets. The pet-related product 30 may comprise food, water treatment chemicals, or other products commonly used with fish or other pets kept in an aquarium whether filled with water or not. The containers 20 are preferably made from non-toxic plastic and decorated with aquarium-safe non-toxic paint. The containers 20 may be made from typical injection molded, blow molded, or rotary molded processes. The decorations may also be provided by stickers using non-toxic adhesive. The decorations may be three-dimensional protrusions or two-dimensional paint or stickers.

Figure 1B:
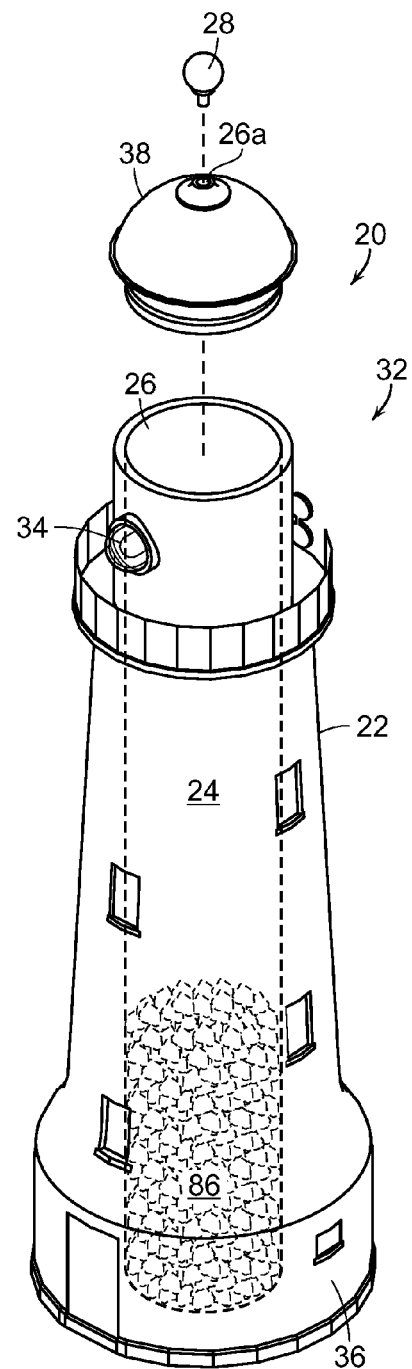
FIG. 1B is an exploded perspective view of a container that resembles a lighthouse.

FIGS. 1A and 1B illustrate a first preferred embodiment of the container 20 of the present invention. In this embodiment, the container 20 is shaped to resemble a lighthouse 32.

The top of the lighthouse 32 includes a light source 34, as an LED or other type of light, configured to resemble the light found in an actual lighthouse. The internal compartment 24 is illustrated using dashed lines to indicate that it is inside of the lighthouse 32. The internal compartment 24 is configured such that the lighthouse 32 includes a base portion 36 that gives the bottom of the lighthouse 32 sufficient weight to remain upright in a buoyant environment such as when submerged in an aquarium.

A cap 38 included in the top of the lighthouse 32 covers the opening 26 to the internal compartment 24. Being the highest-most point on the lighthouse 32, the top of the cap 38 includes the plug means 28 covering the secondary opening 26A. The cap 38 may be removable or hingedly attached to the container 20.

Figure 2A:
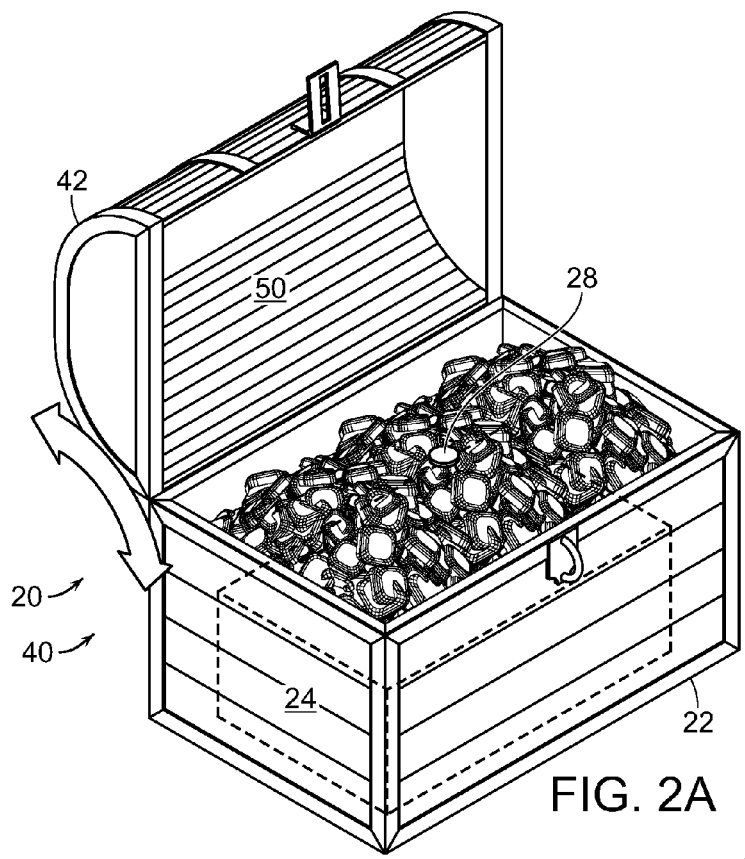
FIG. 2A is an elevated perspective view of a container that resembles a treasure chest.
Figure 2B:
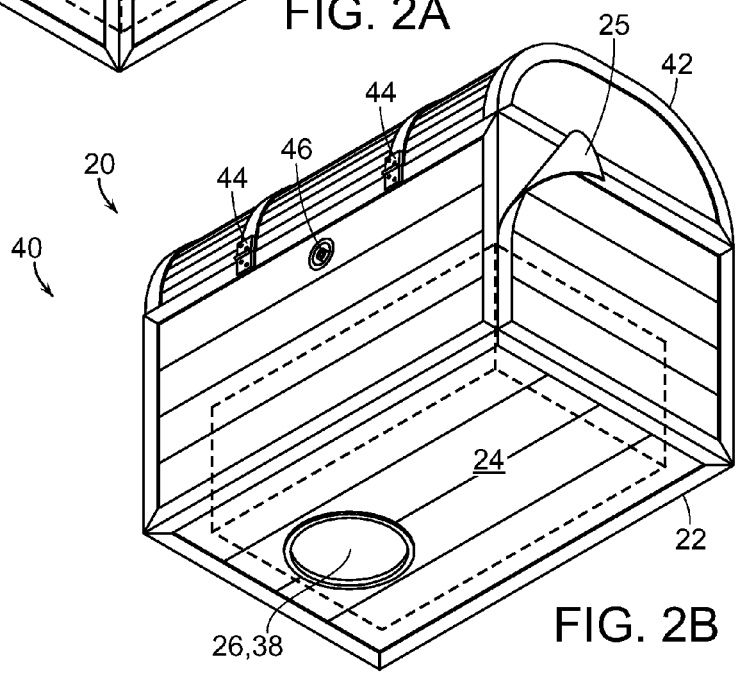
FIG. 2B is a rear lower perspective view of a container that resembles a treasure chest.

FIGS. 2A and 2B illustrate another alternate embodiment of the container 20 of the present invention. In this embodiment, the container 20 is configured to resemble a treasure chest 40 having a lid 42 connected to the chest 40 by a pivoting hinge 44 and containing a quantity of treasure. The chest 40 may include one or more light sources to resemble twinkling gems in the treasure. The internal compartment 24 is disposed in a base of the chest 40 and the opening 26 is preferably on the bottom. The plug 28 and secondary opening 26a are located under the lid 42. A fitting 46 is disposed preferably on a back of the treasure chest 40 to provide an attachment point for an air bubbler tube 48 that releases air into an interior cavity 50 of the lid 42. The lid 42 is sufficiently weighted such that it rests in a substantially closed position when the chest is submerged. As air from the bubbler tube 48 fills the cavity 50 in the lid 42 the buoyancy of the lid 42 changes. Once a sufficient quantity of air fills the cavity 50 the buoyancy of the air overcomes the weight of the lid 42 such that it raises in the water to release the trapped air. Once the trapped air is released, the lid 42 falls under its own weight such that it is again substantially closed against the base of the chest 40. The process repeats as long as air continues to bubble through the tube 48.

Figure 3A:
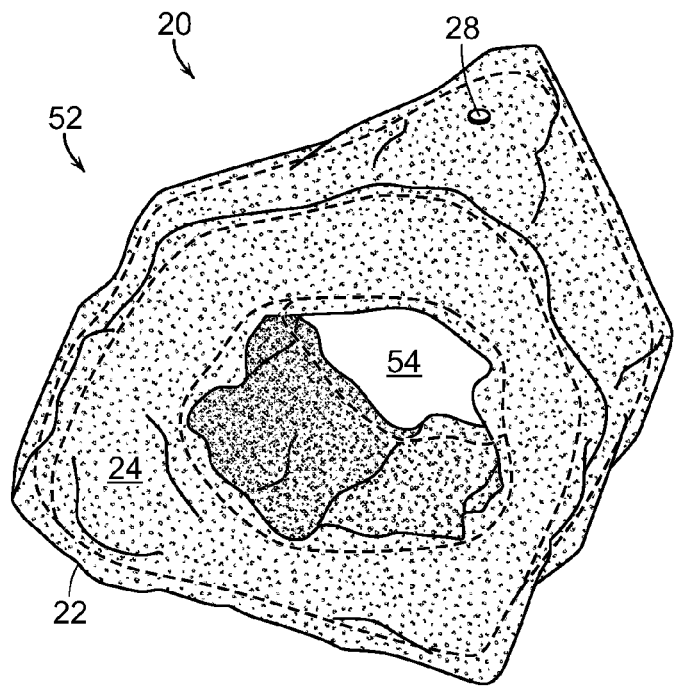
FIG. 3A is an elevated perspective view of a container that resembles a rock sculpture.
Figure 3B:
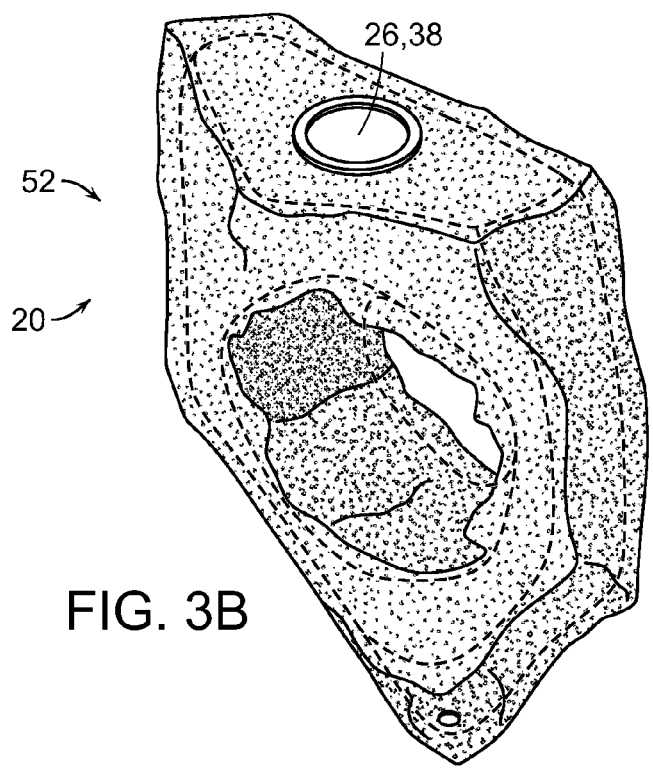
FIG. 3B is an inverted perspective view of a container that resembles a rock sculpture.

FIGS. 3A and 3B illustrate another alternate embodiment for the container 20 of the present invention. In this embodiment, the container 20 resembles a rock sculpture 52. The rock sculpture 52 preferably resembles any type of rock that may be found under water or in an aquarium and may include a tunnel or passage 54 through the sculpture. The tunnel or passage 54 may allow a fish or other inhabitant of the aquarium to pass therethrough. The tunnel or passage 54 may be included in any of the other embodiments to allow a fish to swim therethrough. The passage 54 may be included in another sculpture, such as a castle, home, or similar building. The opening 26 is preferably on an underside of the rock sculpture 52 so as not to be visible when placed in the aquarium. The plug 28 and secondary opening 26a are preferably disposed on the top of the rock sculpture 52 so as to be in the highest position when the same is placed in an aquarium. The internal compartment 24 is illustrated in dotted lines and preferably surrounds the tunnel or passage 54.

Figure 4A:
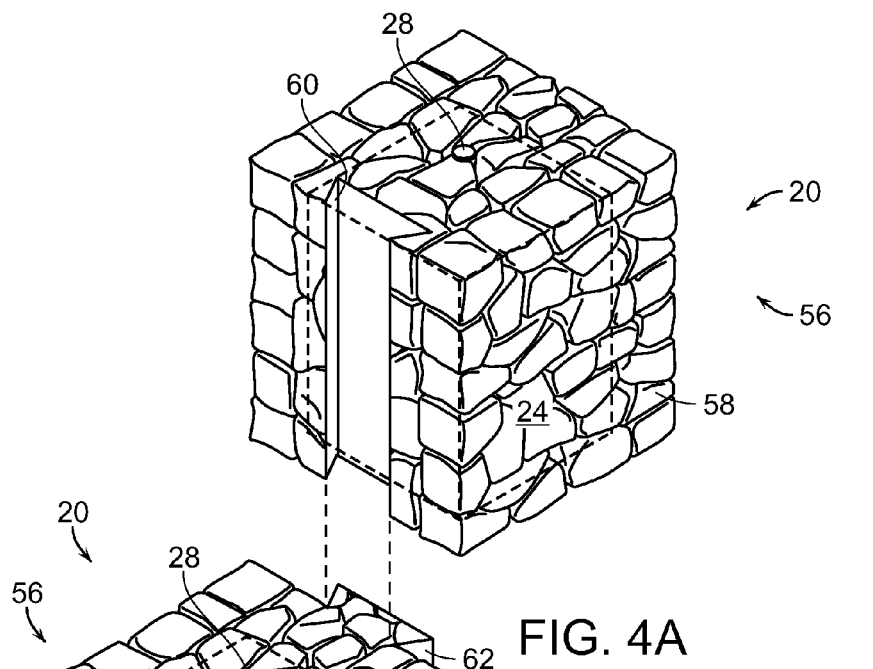
FIG. 4A is an elevated perspective view of a container that resembles two wall blocks.
Figure 4B:
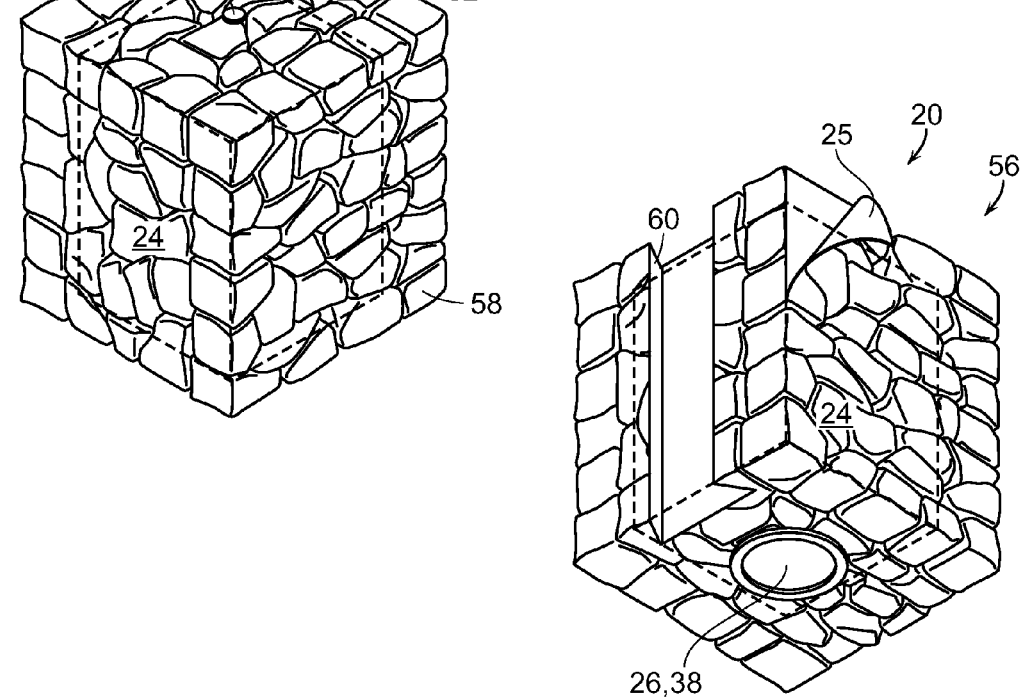
FIG. 4B is a lower perspective view of a container that resembles a wall block.

FIGS. 4A and 4B illustrate another alternate embodiment of the container 20 of the present invention. In this alternate embodiment, the container 20 resembles a wall block 56 or similar design. The surfaces of the wall block 56 preferably have a pattern or decoration such as a stone or brick pattern 58. The opening 26 is preferably disposed on the bottom of the wall block 56 so as to be hidden from view when the wall block 56 is placed in an aquarium. The plug 28 and secondary opening 26a are preferably disposed on a top surface of the wall block 56.

One side of the wall block 56 may include a slot or groove 60 configured to receive a tongue 62 disposed on a surface of another wall block 56. In this way, the tongue 62 of one wall block 56 may be inserted into the slot or groove 60 of a second wall block 56 so as to assemble a longer wall structure. The wall block 56 may be sold having both a slot 60 and a tongue 62. Alternatively, the wall blocks 56 may be sold having only one of the tongue 62 and slot or groove 60. In this way, a wall assembled from multiple wall blocks 56 may be constructed such that an exposed tongue 62 or slot or groove 60 is not visible in an assembled wall segment. Multiple wall blocks 56 may be connected by other structures, such as studs and holes, i.e., LEGO®-type connectors.

Figure 5A:
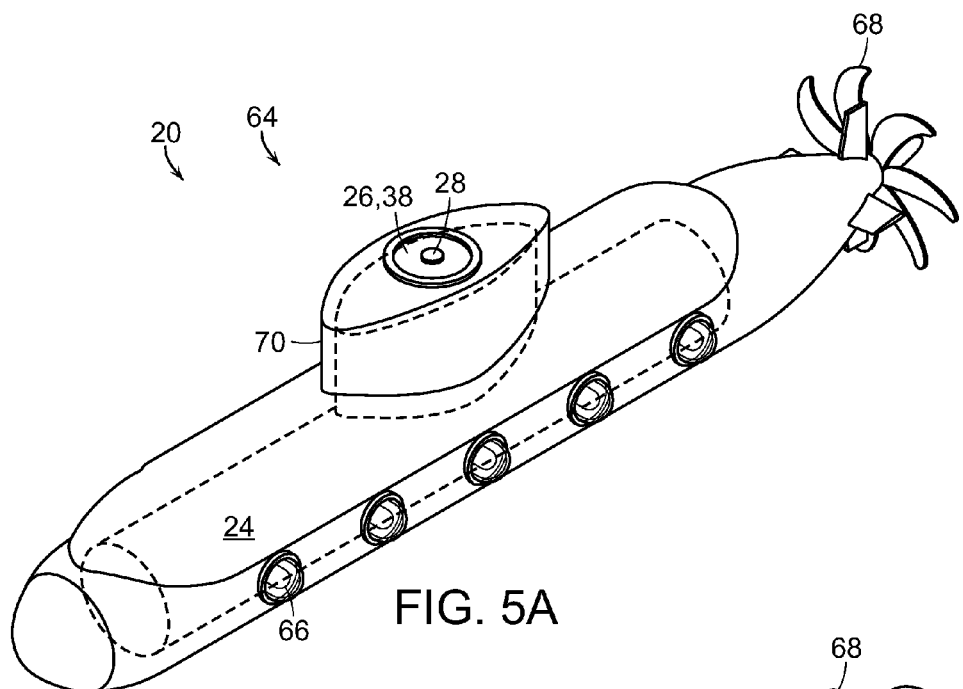
FIG. 5A is an elevated perspective view of a container that resembles a submarine.
Figure 5B:
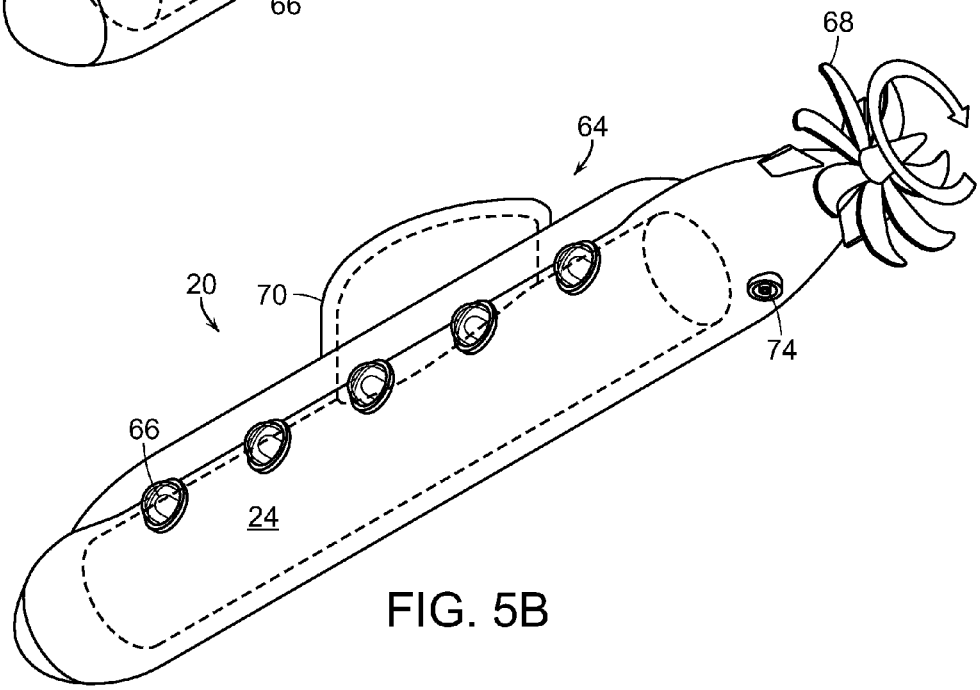
FIG. 5B is a lower perspective view of a container that resembles a submarine.

FIGS. 5A and 5B illustrate yet another embodiment of the container 20 of the present invention. In this embodiment, the container 20 resembles a submarine 64. The submarine preferably includes a plurality of lights 66, i.e., LED or otherwise, disposed along its sides and a rotating propeller 68. The opening 26 is preferably disposed on the top of a tower 70 of the submarine 64. The plug 28 and secondary opening 26a may be included in a cap 38 designed to cover the opening 26 in the top of the tower 70. A fitting 74 is preferably disposed proximate to the propeller 68. An air bubbler tube 76 attached to the fitting 74 preferably introduces air bubbles into the propeller 68 to rotate the same.

FIGS. 6A and 6B illustrate another alternate embodiment of the container 20 of the present invention. This ornamental embodiment is configured to represent a vase 78 having a plant 80 with leaves and stems growing out of the top. The opening 26 is preferably disposed on the bottom of the vase so as to be hidden from view when it is placed in an aquarium. The plug 28 and secondary opening 26a are preferably in the top of the vase among the leaves of the plant 80. A fitting 82 is preferably disposed on the vase 78 so as to receive an air bubbler tube 84. Air introduced into the fitting 82 is preferably released among the leaves of the plant 80 so as to cause the leaves to appear to sway in the water of the aquarium.

In each of the embodiments, a weighted ballast material 86 is preferably added to the internal compartment 24 before the container 20 is submerged in the water of the aquarium. The ballast 86 may be integral with the structure of the container 20 rather than added separately to the internal compartment 24. The plug 28 is preferably removed from the secondary opening 26a so as to allow any excess air trapped in the internal compartment 24 to escape. When adding the container 20 to an aquarium, a user preferably orients the container 20 initially so as to release any excess air from the internal compartment 24. This may be accomplished by removing a cap or other cover from the opening 26 and orienting the container 20 such that the opening is upward and any air in the internal compartment 24 would be replaced by water from the aquarium. Once this is accomplished, the cap may be replaced on the opening 26 and the container 20 positioned in the aquarium as desired.

Figure 7:
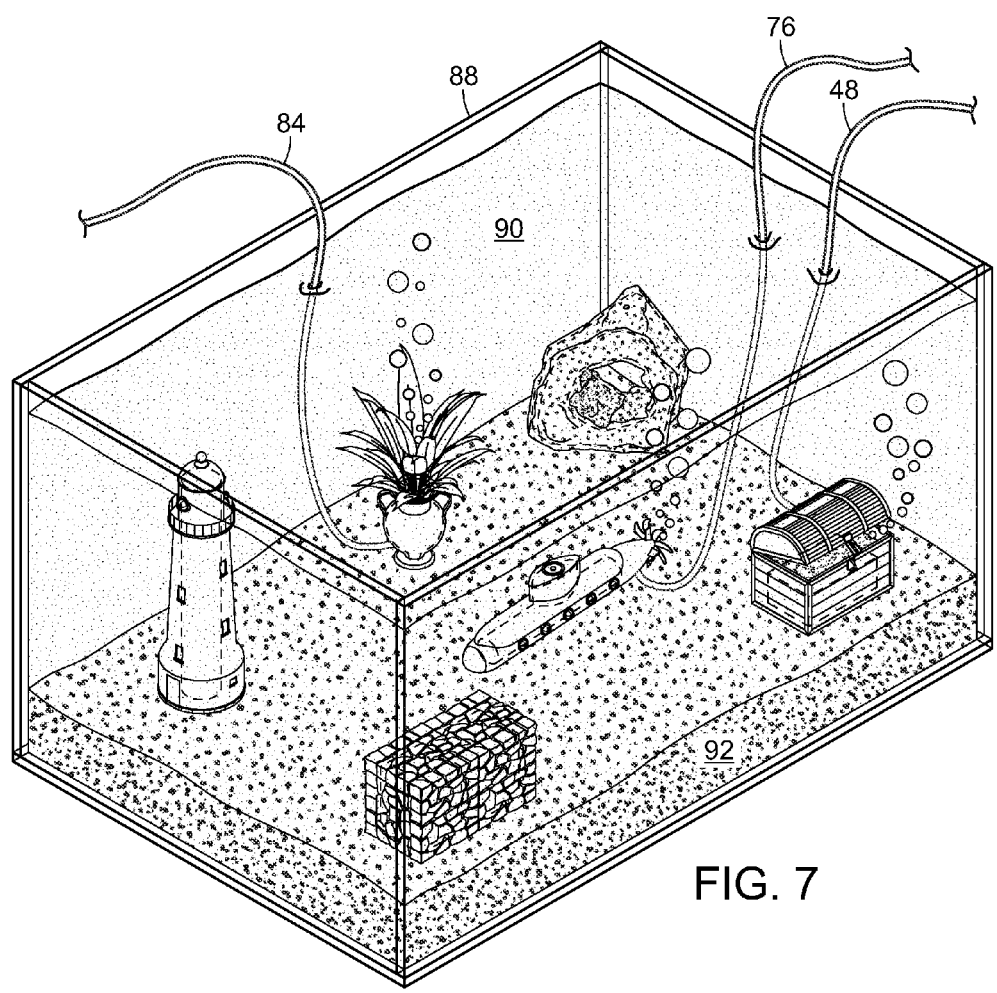
FIG. 7 is an environmental view of various embodiments of the container of the present invention illustrated in an aquarium.

FIG. 7 illustrates an environmental view of an aquarium 88 containing one sample of each embodiment of the container 20 of the present invention. The aquarium 88 contains water 90 and rocks 92.

Figure 8:
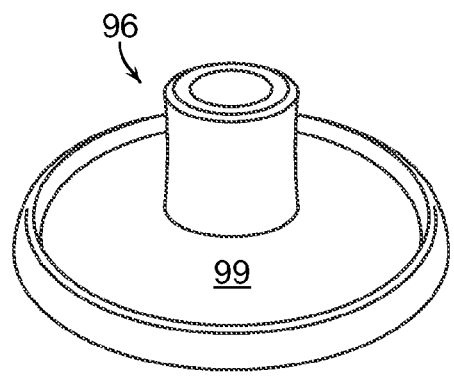
FIG. 8 is a perspective view of an anchor device according to the present invention.
Figure 9:
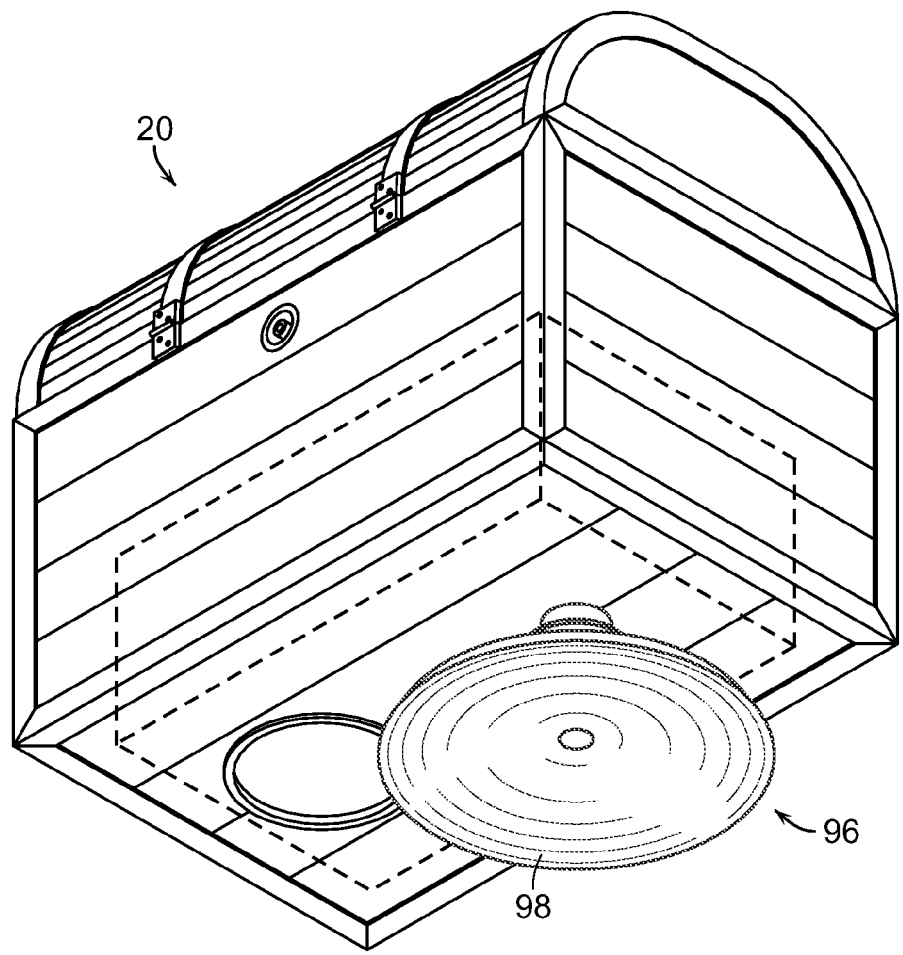
FIG. 9 is a lower perspective view of the anchor device attached to a bottom of a container of the present invention.

FIGS. 8 and 9 illustrate an anchor device 96 such as an extended base that is used for anchoring the container 20 to the bottom of an aquarium 88. The anchor device 96 is attached to an underside of the container 20 and then secured to the bottom of the aquarium 88 as by the weight of rocks 92 or other securing mechanism on top of a tray 99. To secure the anchor device 96, one simply maneuvers the container 20 back and forth to allow gravel or rocks 92 to surround and rest on top of the tray 99 on the anchor device 96. The weight of the gravel or rocks 92 will hold the anchor device 96 against the bottom of the aquarium 88 and likewise prevent the container 20 from floating in the water 90. The exact shape, configuration and design of the anchor device 96 may vary so as to securely anchor the particular container 20. The anchor device 96 may alternatively comprise a suction cup 98 (FIG. 9) that attaches itself to the bottom glass of the aquarium 88.

Figure 10:
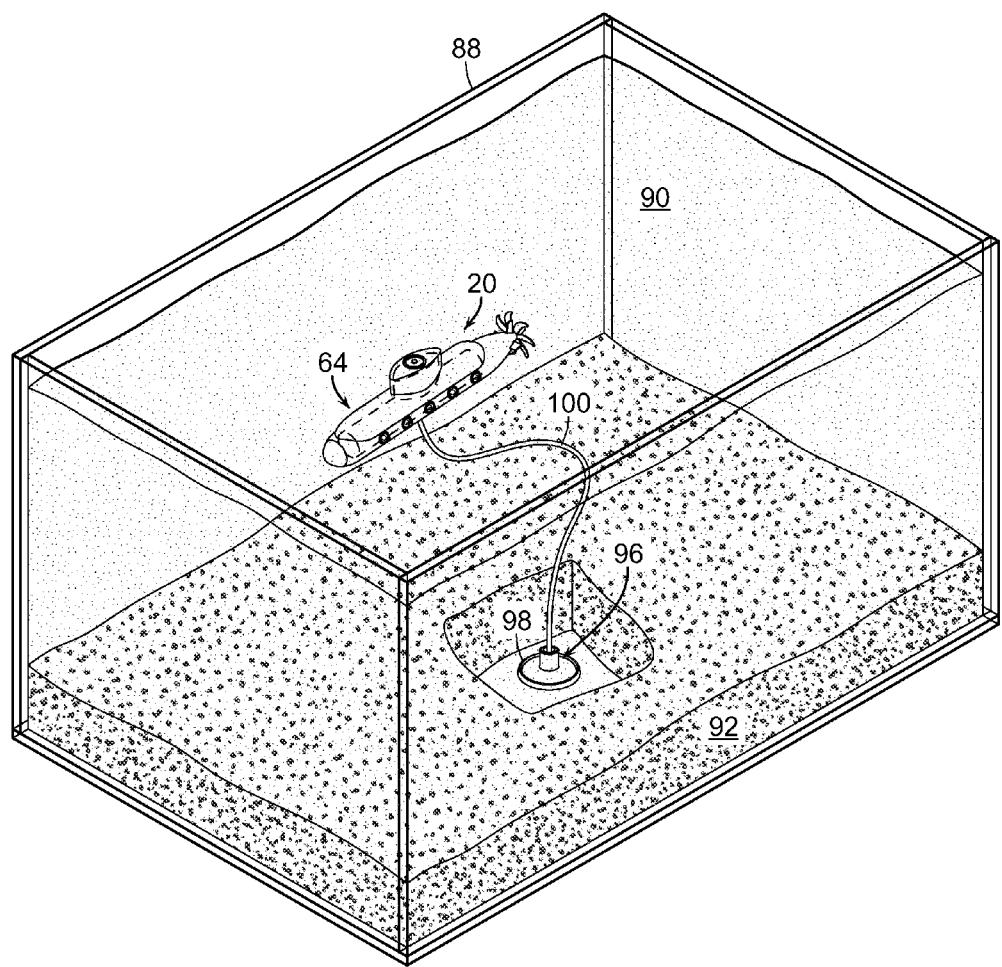
FIG. 10 is an environmental view of an alternate embodiment of the container of the present invention.

FIG. 10 illustrates another alternate embodiment in which the container 20 is configured to float in the water 90 of the aquarium 88 between the top and bottom of the same. In this embodiment, the container 20—in any of the various decorative configurations—is configured to trap air within the internal compartment 24 so as to provide buoyancy to the container 20. A structure such as the anchor device 96 is provided with a suction cup 98 or tray 99 as described and secured to the bottom glass of the aquarium 88. FIG. 10 illustrates the gravel 92 moved away from the anchor device 96 for clarity. In actual use, the gravel 92 is preferably moved to cover the anchor device 96. A fine wire or string 100 connects the container 20 to the anchor device 96.

When submerged under water, the buoyancy of the container 20 will cause the same to float toward the surface of the water 90. The string 100 will prevent the container 20 from floating all the way to the surface of the water 90. When under water, the string 100 should be virtually invisible as would fishing line, cable, thread, wire, or similar material that is thin or of fine thickness. The string 100 may either be taut or flexible to allow the container 20 to float around and simulate movement. In this embodiment, the container 20 does not require ballast or other weighted material. In fact, the container 20 should be as light as possible to maximize the buoyancy. Any plugs 28 or similar structures provided for a release of air can be left in place. The container 20 may come in other shapes or ornamental configurations such as hot air balloons, fish, sharks, airplanes, blimps, space ships, etc.

In any of the foregoing embodiments, the surface of the container may be adorned with a lenticular or holographic material that produces three-dimensional or moving images on a two-dimensional surface. Such material may be adhered to the outer surface of the container to produce a desired visual presentation. In particular, appliqués 25 constructed to give the illusion of depth perception on a two-dimensional object may be applied to the outer surfaces of the containers. On curved surfaces, the appliqués 25 may be wrapped or crimped to turn the corners. Such appliqués 25 may provide static three-dimensional imagery, or may give the illusion of motion as the viewing angle changes.

Figure 11:
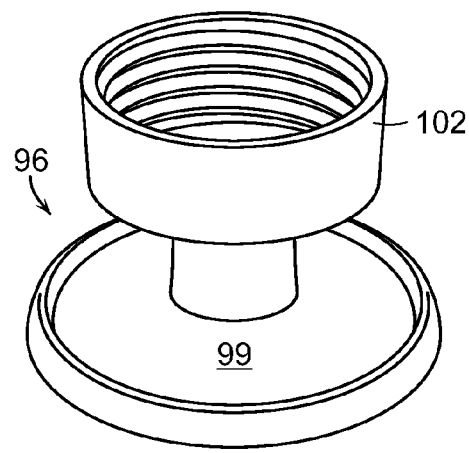
FIG. 11 is a perspective view of an alternate embodiment of the anchor device of FIG. 8.
Figure 12:
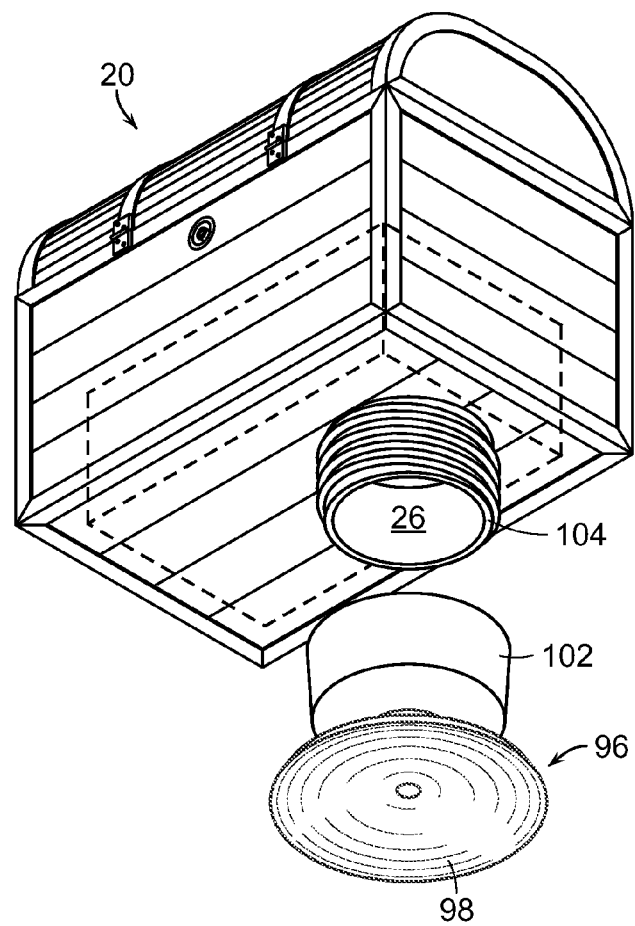
FIG. 12 is a lower perspective exploded view of the alternate embodiment of the anchor device and a container of the present invention.

FIGS. 11 and 12 illustrate an alternate embodiment of the anchor device 96 of the present invention. In this embodiment, the anchor device comprises a threaded cap 102. The threaded cap 102 is on the top of the anchor device 96 which may include the tray 99 as illustrated in FIG. 11 or the suction cup 98 as illustrated in FIG. 12. The threaded cap 102 is configured to be removably attached to a threaded neck 104 on the opening 26 to the internal compartment 24. With this embodiment, any of the previously described containers 20 may be configured such that the opening 26 is on a base or under side of the container 20. In this way, the container 20 may be used to dispense the contents of the internal compartment 24 and stored upright on the anchor device 96. Once the contents of the internal compartment 24 have been fully dispensed, the container 20 in whatever configuration may be placed upright in the aquarium with the anchor device 96 secured to the bottom glass of the aquarium 88 as described.

Although various embodiments have been described in detail for purposes of illustration, various modifications may be made without departing from the scope and spirit of the invention. Accordingly, the invention is not to be limited, except as by the appended claims.

What is claimed is:

1. A process for utilizing a container as dual use packaging, first as a container for a fish-related product and second as a decorative ornament in an aquarium, comprising the steps of:
   providing a container, wherein said container comprises
      a housing having a three-dimensional shape and an external decorative element,
      an internal compartment configured to hold a fish food, medicine or aquarium chemicals therein,
      a primary opening for accessing said internal compartment,
      a cover for selectively opening and closing said primary opening,
      a secondary opening, and
      a plug for selectively opening and closing said secondary opening,
   filling said internal compartment of the container with the fish-related product through said primary opening;
   selectively pouring the fish-related product from the internal compartment through the primary opening into the aquarium while the container is outside of the aquarium;
   after the fish related product has been completely dispensed from the internal compartment, performing at least one of the following steps:
      a) adding ballast to the internal compartment,
      b) attaching an anchor device to a base of the container housing;
   submerging the container in water in the aquarium; and
   utilizing the container as a decorative ornament within the aquarium after it has been submerged in the aquarium below the water surface.

2. The process of claim 1, further comprising the step of adding ballast to the internal compartment before performing the submerging step.

3. The process of claim 1, further comprising the step of adjusting the buoyancy of said container while submerged by selectively opening or closing said secondary opening via said plug to adjust the amount of air trapped within said internal compartment.

4. The process of claim 1, wherein the container resembles a lighthouse and the decorative element comprises a light source in a top of the lighthouse.

5. The process of claim 1, wherein the container resembles a treasure chest and the decorative element comprises a hinged lid.

6. The process of claim 5, further comprising the steps of attaching a bubbler to a fitting on the treasure chest, and bubbling air into a cavity on the hinged lid so as to periodically lift the hinged lid and release the air.

7. The process of claim 1, wherein the container resembles a rock sculpture and the decorative element comprises a passage through the rock sculpture.

8. The process of claim 1, wherein the container resembles a wall block and the decorative element comprises a stone or brick pattern.

9. The process of claim 8, wherein the wall block has a slot on a first side and a tongue on a second side, and further comprising the step of attaching the tongue of the wall block to a slot on a second wall block.

10. The process of claim 1, wherein the container resembles a submarine and the decorative element comprises a plurality of LED lights along a length of the submarine and/or a propeller at a rear of the submarine.

11. The process of claim 10, further comprising the steps of attaching a bubbler to a fitting on the submarine, and bubbling air into the propeller so as to turn the propeller.

12. The process of claim 1, wherein the container resembles a vase and the decorative element comprises a plant having leaves extending from the vase.

13. The process of claim 12, further comprising the steps of attaching a bubbler to a fitting on the vase, and bubbling air into the leaves on the plant so as to move the leaves.

14. The process of either of claim 1, further comprising the steps of making the container buoyant in the water, attaching an anchor device to the container by a length of fine cord, and securing the anchor device to a bottom of the aquarium.

15. The process of claim 1, wherein the opening to the internal compartment comprises a threaded neck and the anchor device comprises a threaded cap, further comprising the step of removably attaching the threaded cap to the threaded neck.

16. The process of claim 1, wherein the decorative element comprises an applique applied to a surface of the container.

17. The process of claim 16, wherein the appliqué adds three-dimensional imagery to an exterior surface of the container.

* * * * *